(12) United States Patent
Oh

(10) Patent No.: US 10,810,794 B2
(45) Date of Patent: Oct. 20, 2020

(54) METHOD AND APPARATUS FOR 3D CLOTHING DRAPING SIMULATION

(71) Applicant: CLO VIRTUAL FASHION INC., Seoul (KR)

(72) Inventor: Seung Woo Oh, Seoul (KR)

(73) Assignee: CLO VIRTUAL FASHION INC., Seoul (KR)

(*) Notice: Subject to any disclaimer, the term of this patent is extended or adjusted under 35 U.S.C. 154(b) by 92 days.

(21) Appl. No.: 15/497,957

(22) Filed: Apr. 26, 2017

(65) Prior Publication Data

US 2018/0025539 A1 Jan. 25, 2018

(30) Foreign Application Priority Data

Jul. 21, 2016 (KR) .................. 10-2016-0092791

(51) Int. Cl.
*G06T 17/20* (2006.01)
*G06T 19/00* (2011.01)
*A41H 3/00* (2006.01)

(52) U.S. Cl.
CPC ............ *G06T 17/20* (2013.01); *A41H 3/007* (2013.01); *G06T 19/00* (2013.01); *G05B 2219/2626* (2013.01); *G05B 2219/45195* (2013.01); *G06T 2210/16* (2013.01); *G06T 2210/21* (2013.01)

(58) Field of Classification Search
CPC .............. G05B 2219/2626; G05B 2219/45195
See application file for complete search history.

(56) References Cited

U.S. PATENT DOCUMENTS

2014/0225888 A1* 8/2014 Bell ..................... G06T 17/00
345/419

FOREIGN PATENT DOCUMENTS

KR 10-2014-0108451 A 9/2014

OTHER PUBLICATIONS

Berthouzoz et al., Parsing Sewing Patterns into 3D Garments, Jul. 2013, ACM Transactions on Graphics, vol. 32, No. 4, Article 85, pp. 85:1-12 (Year: 2013).*
Volino, P. et al., "Resolving surface collisions through intersection contour minimization," ACM Trans. Graph, vol. 25. No. 3, 2006 (6 pages).
"Marvelous Designer 2 & CLO 3D 2011 Manual," CLO Virtual Fashion Inc., Feb. 24, 2011 (145 pages).

* cited by examiner

*Primary Examiner* — Matthew Salvucci
(74) *Attorney, Agent, or Firm* — NSIP Law

(57) ABSTRACT

The present disclosure relates to a method of applying a sublayer in which a layer is applied on the basis of a sewing line as a unit and an apparatus thereof in making 3D clothing by computer simulation. A partial region within a pattern is designated by selecting a sewing line through a user interface, and a sublayer in which a layer is set on the basis of the sewing line is set.

17 Claims, 8 Drawing Sheets

METHOD AND APPARATUS FOR 3D CLOTHING DRAPING SIMULATION

STATEMENT REGARDING FOREIGN GOVERNMENT SPONSORED RESEARCH OR DEVELOPMENT

This invention (R2015040052) was supported by Ministry of Culture, Sports and Tourism (MCST) and Korea Creative Content Agency (KOCCA), both agencies of the government of the Republic of Korea.

CROSS-REFERENCE TO RELATED APPLICATION(S)

This application claims priority from Korean Patent Application No. 10-2016-0092791, filed on Jul. 21, 2016, in the Korean Intellectual Property Office, the disclosure of which is incorporated herein by reference in its entirety.

BACKGROUND

1. Field

The present disclosure relates to a computer simulation technology, and more particularly, to a draping simulation technology for draping two-dimensional (2D) clothing patterns on an avatar.

2. Description of Related Art

Nowadays, a clothing draping simulation technology is used in various fields including the fashion industry as well as games, animations, and special effects of movies. Also, a market size of clothing item sales in virtual worlds amounts to several trillion won.

In Korean Unexamined Patent Application Publication No. 10-2014-0108451 published on Sep. 11, 2014, a method of draping clothing on a three-dimensional (3D) avatar is disclosed as a 3D clothing draping simulation process. In a process in which a 2D pattern is arranged near an avatar and sewn to generate clothing to be fitted to the avatar, the pattern may pass through the avatar, and the pattern and the avatar may intersect each other. In the draping method, to remove such an intersection, whether an intersection has occurred is determined by searching for a mesh in which an intersection between the pattern and the avatar has occurred, when a mesh in which the intersection has occurred is present, an intersection removing force having a predetermined magnitude for pushing the mesh toward the outside of the avatar's skin is generated, and the generated intersection removing force having the predetermined magnitude is applied to the corresponding mesh to remove the intersection.

In existing cases in which a seam allowance is folded using a folding function or meshes of clothing are reset, a simulation becomes unstable as patterns collide and intersect with each other. Further, when strip patterns are sewn on clothing, because a concept of top and bottom does not exist between the patterns, the patterns are tangled and sewn.

SUMMARY

In a clothing making process, folding an edge of clothing and sewing or overlaying a pattern on the clothing is required in many cases. When an edge of clothing is folded, a folding angle may be set between folded patterns using a folding function. In this case, the patterns intersect, and treating collision between patterns becomes unstable in some cases. Also, after a remeshing process in which patterns are folded using a folding function and then meshes of clothing are reset is performed, the folded patterns often get tangled with each other. Once the patterns are tangled, it is difficult to untangle the patterns. Thus, there is a great inconvenience for 3D clothing makers.

It is an aspect of the present disclosure to provide a user interface tool that enables a layer to be set on the basis of a sewing line.

Further, by setting a layer between sewing lines with a sewing line as a unit, it is another aspect of the present disclosure to prevent intersection or collision between patterns when the patterns are folded or overlap each other.

According to an aspect, a 3D clothing draping simulation method includes a sewing line designating step in which a first line and a second line are designated, a sublayer inputting step in which a sublayer relation between the first line and the second line is received, and a sublayer applying step in which a layer limitation is applied on a portion of a pattern including the first line and the second line so that the first line and the second line which have received the sublayer relation are layered with each other.

According to an aspect, the sublayer applying step may include extracting meshes including the first line and the second line as line segments.

According to an aspect, the sublayer applying step may include connecting lattice points of meshes including the first line as line segments and vertices of meshes including the second line as line segments by a spring.

According to an aspect, the sublayer applying step may include fixing a pattern region including the second line as a line segment, moving a pattern region including the first line as a line segment, and overlaying the pattern region including the first line as a line segment on the pattern region including the second line as a line segment.

According to another aspect, prior to the sewing line designating step, the 3D clothing draping simulation method may further include extracting sewing lines sewn on a clothing pattern.

According to still another aspect, prior to the sublayer applying step, the 3D clothing draping simulation method may include generating a guideline in one direction showing a sublayer relation between the first line and the second line and an operation symbol.

According to yet another aspect, the sublayer inputting step may include receiving a front and behind relation between the first line and the second line.

According to yet another aspect, the sublayer inputting step may include a reverse inputting step in which roles of the first line and the second line are switched.

According to an aspect, a 3D clothing draping simulation apparatus includes a sewing line designator configured to receive designation of a first line and a second line, a user interface part including a sublayer inputter configured to receive a sublayer relation between the first line and the second line, and a sublayer applier configured to apply a layer limitation on a portion of a pattern including the first line and the second line so that the first line and the second line which have received the sublayer relation are layered with each other.

Other features and aspects will be apparent from the following detailed description, the drawings, and the claims.

Figure 1:
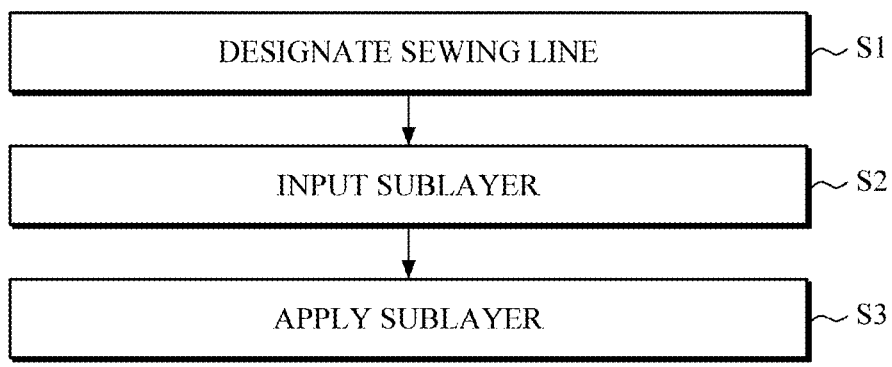
FIG. 1 is a flowchart illustrating a sublayer applying method according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-mentioned and additional aspects of the present disclosure will become more apparent through embodiments that will be described below. Hereinafter, the present disclosure will be described in detail by describing embodiments with reference to the accompanying drawings so that one of ordinary skill in the art can easily understand and reproduce the present disclosure. Further, the present disclosure may be implemented in various different forms and is not limited to the embodiments described herein.

Parts unrelated to the description have been omitted to clearly describe the present disclosure, and like reference numerals have been assigned to like parts throughout. When it is said that a certain part "includes" a certain element, this means that the certain part may further include another element instead of excluding another element unless particularly described otherwise. In the specification, the term "part" refers to a "block configured to enable a hardware or software system to be changed or plugged in, i.e., a single unit or block configured to perform a function in hardware or software.

The present disclosure relates to a method of applying a layer between patterns in a 3D clothing draping simulation method and an apparatus thereof and a medium in which a computer program for executing the method is recorded, and may be applied to the 3D simulation technology field.

Hereinafter, the present disclosure will be described in detail with reference to the drawings.

3D clothing is generated by having an actual clothing making process as a motif and using a computer simulation program in which the process is reflected. For example, a maker draws a 2D pattern of clothing, and then performs a simulation of draping the 2D pattern on an avatar model to which the clothing will be fitted. By rendering and displaying a draping result, 3D clothing is output to a screen. A user may directly draw the avatar model and the 2D clothing pattern using a computer program or use pre-stored ones. When directly drawing the avatar model and the 2D clothing pattern, the user may input the avatar model and the 2D clothing pattern using various graphic software or a computer-aided design (CAD) program, or user a provided 2D pattern making tool.

According to an embodiment, in a 3D clothing draping simulation method, a draping simulation method includes forming a 2D pattern into meshes, determining an arrangement of a pattern near an avatar and whether the pattern and the avatar collide with each other, generating a collision removing force, and performing a draping simulation process.

Here, a method disclosed in [Pascal Volino, Nadia MagnenatThalmann: Resolving surface collisions through intersection contour minimization. ACM Trans. Graph. 25(3): 1154-1159 (2006)] may be used in the draping simulation process.

According to an embodiment, a 2D pattern refers to a result of simulating a pattern that is cut to form 3D clothing as a 2D object in a computer. The 2D pattern is generated by setting an outer shape and physical properties of a clothing material. Information on an outline of the 2D pattern needs to be input to show an outer shape of the 2D pattern. An outline and vertices of a pattern may be generated using a CAD tool or various graphic program tools or may be selected from a database including 2D pattern models in accordance with clothing types and used. An inside of a 2D pattern whose outer shape is determined by an outline may be formed of triangular or rectangular meshes. A mesh may be formed of lattice points having mass and a spring configured to connect the lattice points. Properties of a 2D pattern material, and shapes of a clothing material such as folding and sagging thereof may be shown using the lattice points and the spring. A sewing line is a line marked after a sewing process in which 2D patterns are connected is performed, and refers to an outline that is common to both 2D patterns.

FIG. 1 is a flowchart illustrating a configuration of a sublayer applying method for setting a layer between sewing lines in a 3D clothing draping simulation method according to an embodiment.

According to an aspect, the 3D clothing draping simulation method includes designating a sewing line (S1), inputting a sublayer (S2), and applying the sublayer (S3).

A sublayer refers to a layer set between sewing lines with a sewing line as a unit.

According to an aspect, the designating of the sewing line (S1) includes a first line 10 and a second line 20 being designated by a user. According to an embodiment, the first line 10 and the second line 20 to which a sublayer will be set among sewing lines sewn on a 2D pattern or 3D clothing may be designated. First, the first line 10 is designated, and then the second line 20 is designated. According to an embodiment, the first line 10 and the second line 20 may be designated by a user clicking a sewing line marked on a 3D screen by an input device such as a mouse and a touch pen using a cursor output on the screen. According to an embodiment, every time the first line 10 and the second line 20 are designated, a marking state of a sewing line may be changed to show that the first line 10 and the second line 20 have been designated. For example, color of the sewing line is changed, or the sewing line is highlighted.

Figure 2:
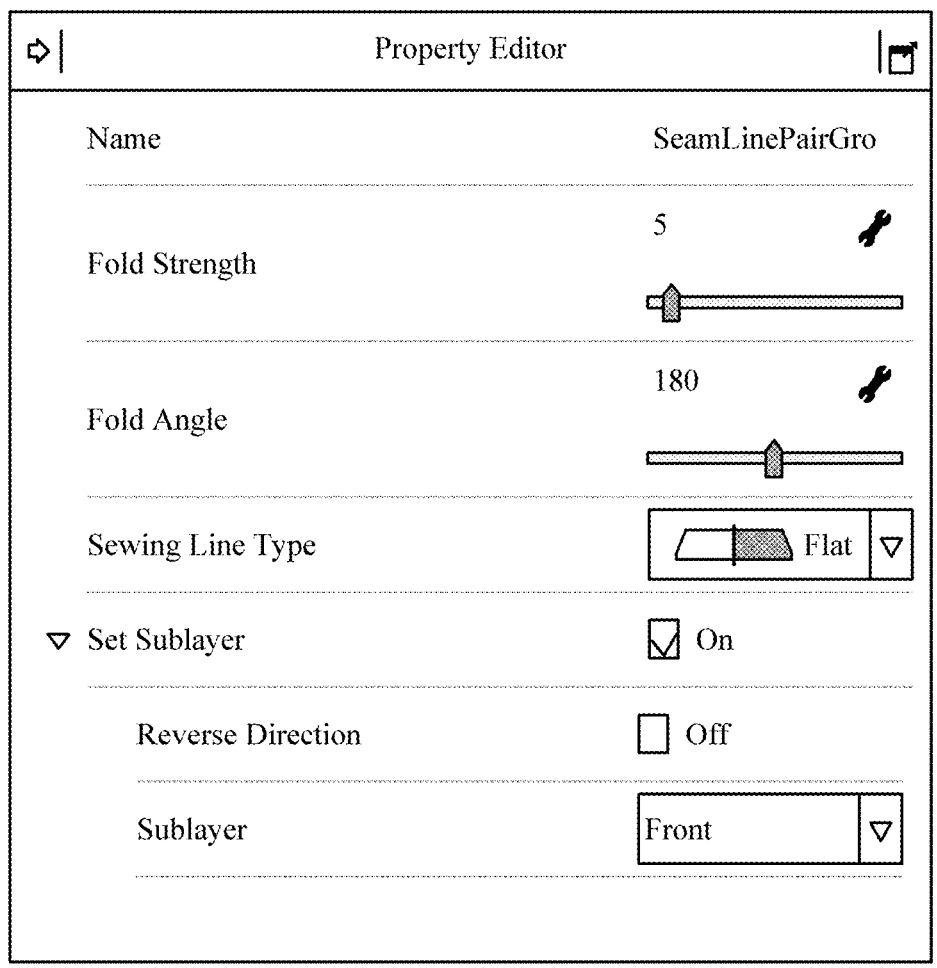
FIG. 2 illustrates a user interface tool related to sewing line features according to an embodiment.

FIG. 2 illustrates an interface tool for setting sewing line features according to an embodiment. As illustrated in FIG. 2, an interface tool for setting features of a sewing line may include a sublayer tool capable of receiving settings related to a sublayer.

According to an aspect, prior to the designating of the sewing line (S1), the 3D clothing draping simulation method further includes extracting sewing lines sewn on a clothing pattern. According to an embodiment, a user may select a sublayer tool before the designating of the sewing line. When a sublayer tool is selected, all sewing lines are extracted from a pattern or clothing and output on a screen. According to an embodiment, the user may designate the first line 10 and the second line 20 by selecting the output sewing lines.

According to an aspect, the inputting of the sublayer (S2) includes receiving a sublayer relation between the first line 10 and the second line 20. According to an embodiment, after both of the first line 10 and the second line 20 are designated, a sublayer relation between the first line 10 and the second line 20 may be input. For example, the inputting of the sublayer relation may be performed by selecting a checkbox for setting a sublayer. An example in which a checkbox for setting a sublayer is selected is illustrated in FIG. 2.

According to another embodiment, the first line 10 and the second line 20 may also be designated after a sublayer is input.

According to an aspect, the applying of the sub-layer (S3) includes applying a layer limitation on a portion of a pattern including the first line and the second line so that the first line 10 and the second line 20 which have received the sublayer relation are layered with each other.

According to an embodiment, the first line 10 and the second line 20 being layered with each other means that the first line 10 and the second line 20 are sewn to overlap each other by being in front of and behind each other. Alternatively, the first line 10 and the second line 20 being layered with each other means that the first line 10 and the second line 20 are sewn to overlap each other by being above or below each other.

According to an embodiment, the layer limitation refers to applying a virtual force between layered patterns so that intersection or collision does not occur between the patterns. According to an embodiment, the first line 10 and the second line 20 may belong to the same pattern or different patterns.

According to an embodiment, for the first line 10 and the second line 20 to be layered, a layer should be set to a pattern including the first line 10 and the second line 20. The first line 10 and the second line 20 actually become a standard for designating a region to which a layer will be applied within a pattern. A portion of a pattern may be extracted from patterns including the first line 10 and the second line 20 which are designated, and a layer limitation may be applied between the extracted regions so that the first line 10 and the second line 20 are layered with each other. This will be described in detail below.

Figure 3:
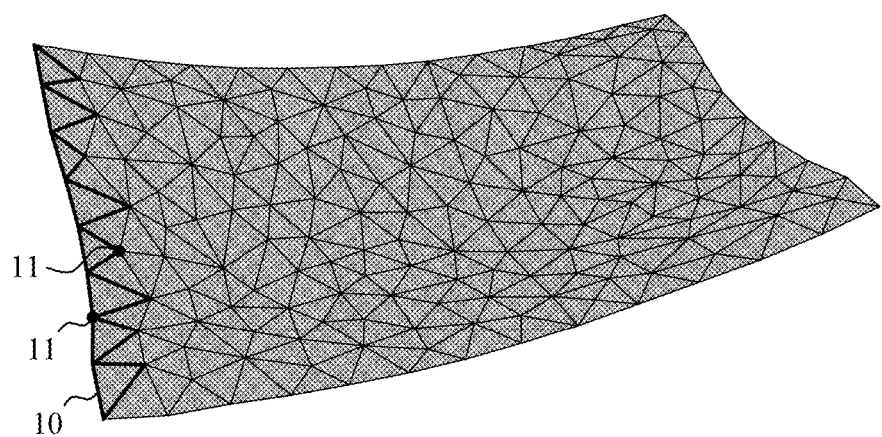
FIG. 3 illustrates a state in which a first line is selected from a pattern according to an embodiment.

FIG. 3 is a view illustrating a first sewing line, a mesh, and lattice points 11 according to an embodiment.

Figure 4:
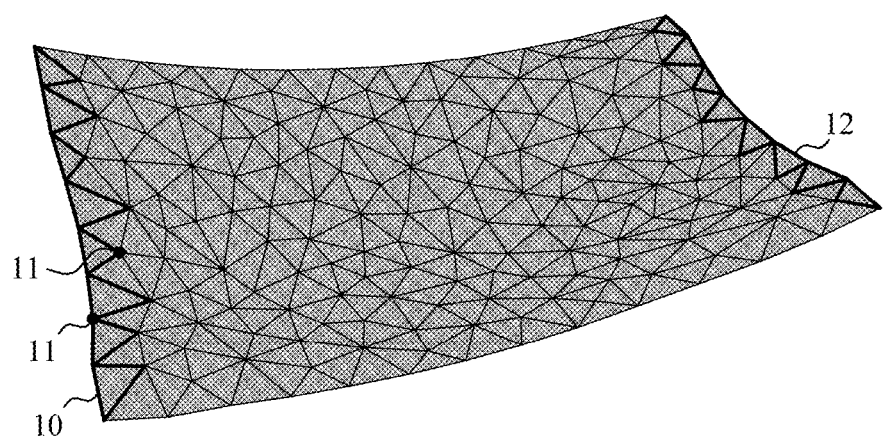
FIG. 4 illustrates a state in which a first line and a second line are selected from a pattern according to an embodiment.

FIG. 4 is a view illustrating the first sewing line, a second sewing line, the mesh, and the lattice points 11 according to an embodiment.

Specifically, according to an aspect, the applying of the sublayer (S3) includes extracting meshes including the first line 10 and the second line 12 as line segments. FIG. 3 illustrates a state in which meshes including the designated first line 10 as a line segment are extracted according to an embodiment. FIG. 4 illustrates a state in which meshes including the first line 10 designated at a left edge of a pattern and the second line 12 designated at a right edge of the pattern as line segments are extracted.

To apply a sublayer as described above, partial regions to which a layer will be applied within patterns including the first line 10 and the second line 12 should be designated.

According to an embodiment, the first line 10 and the second line 12 may be designated from different patterns. Consequently, for example, meshes having the first line 10 as a line segment are extracted from a pattern including the designated first line 10. Also, meshes having the second line 12 as a line segment are extracted from a different pattern including the designated second line 12. According to another embodiment, because the first line 10 and the second line 12 may belong to the same pattern, meshes having the first line 10 and the second line 12 as line segments may be extracted from the pattern including the first line 10 and the second line 12. This is the same as the example shown in FIG. 4 as described above.

According to an aspect, the applying of the sublayer (S3) includes fixing a pattern region including the second line 12 as a line segment, and moving a pattern region including the first line 10 as a line segment to overlay the pattern region including the first line 10 as a line segment on the pattern region including the second line 12 as a line segment. The pattern regions including the first line 10 and the second line 12 may be regions formed of the extracted meshes described above. Alternatively, the pattern regions may be a predetermined region of a pattern including regions of the extracted meshes. According to an embodiment, when the first line 10 and the second line 20 to which a sublayer will be applied are designated, not all of the pattern regions including the first line 10 and the second line 20 are moved, but the second line 12 is fixed and the first line 10 is moved so that the first line 10 which is designated first is moved toward the second line 12 which is designated later. According to still another embodiment, the first line 10 may be fixed, and the second line 12 may be moved toward the first line 10. Here, the first line 10 or the second line 12 being moved means that the pattern regions including the first line 10 or the second line 12 as line segments are moved. This will be described in detail below.

According to an aspect, the applying of the sublayer (S3) includes connecting the lattice points 11 of the meshes including the first line 10 as a line segment and the lattice points 11 of the meshes including the second line 12 as a line segment by a spring. As described above, an inside of a pattern is formed of triangular or rectangular meshes, and a mesh is formed of lattice points having mass and a spring configured to connect the lattice points. Properties of a pattern material, and shapes of a clothing material such as folding and sagging thereof may be shown using the lattice points and the spring.

According to an embodiment, a spring is connected to the lattice points 11 which form the meshes extracted when the sublayer is applied. According to an embodiment, the lattice points 11 of the first line 10 and the lattice points 11 of the second line 12 may correspond to each other. Consequently, the lattice points 11 of the meshes extracted on the basis of the first line 10 and the lattice points 11 of the meshes extracted on the basis of the second line 12 which correspond to each other are connected by the spring. When the lattice points 11 forming the corresponding meshes are connected by the spring, a layer limitation, which is a virtual force caused by the corresponding spring, is generated between patterns, and intersection or collision between the patterns does not occur.

Figure 5:
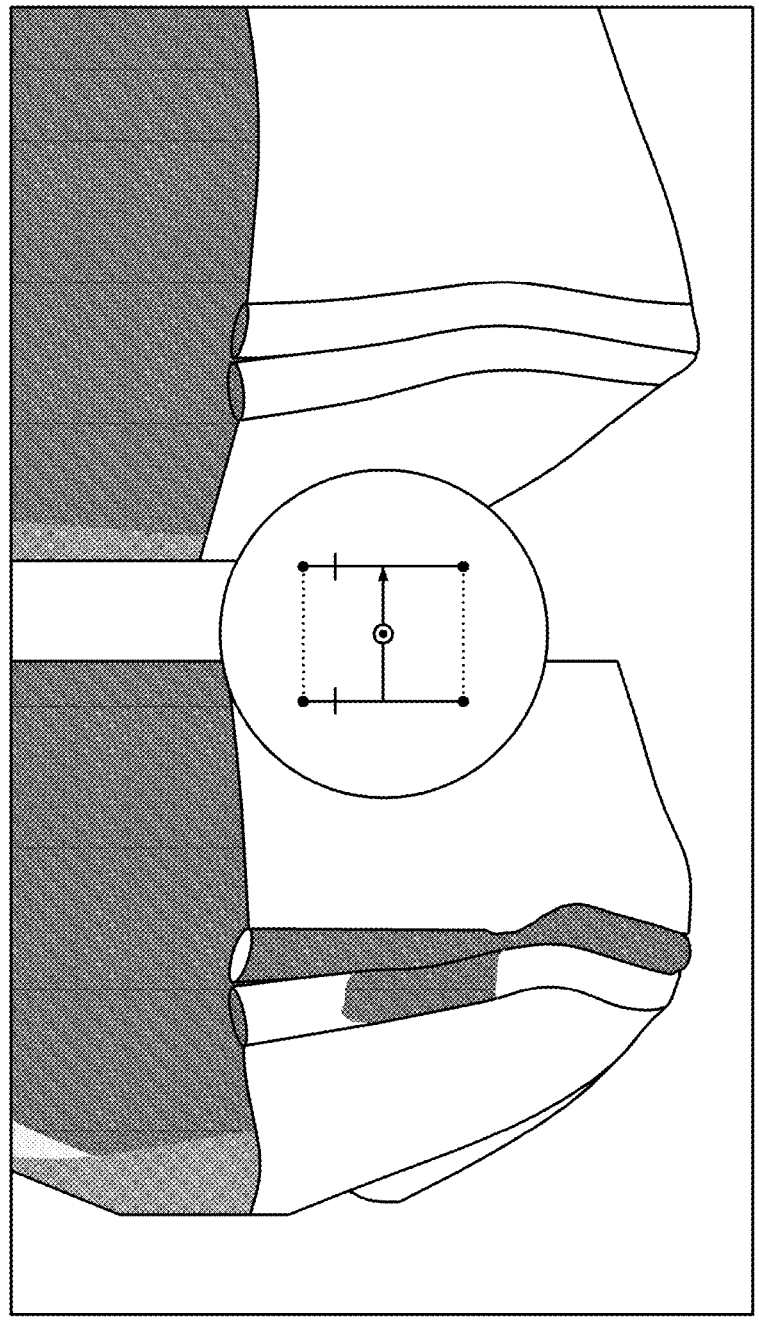
FIG. 5 illustrates a state in which intersection and collision are occurred between patterns and a state in which the intersection and the collision between the patterns are removed at a left side and a right side, respectively.

A state in which an intersection and a collision between patterns are occurred when a strip pattern is sewn on a pattern using the conventional 3D clothing draping simulation method is illustrated at the left side in FIG. 5. Further, a state in which an intersection and a collision between patterns are removed by applying a sublayer of the present disclosure and sewing a strip pattern is illustrated at the right side in FIG. 5.

Figure 6:
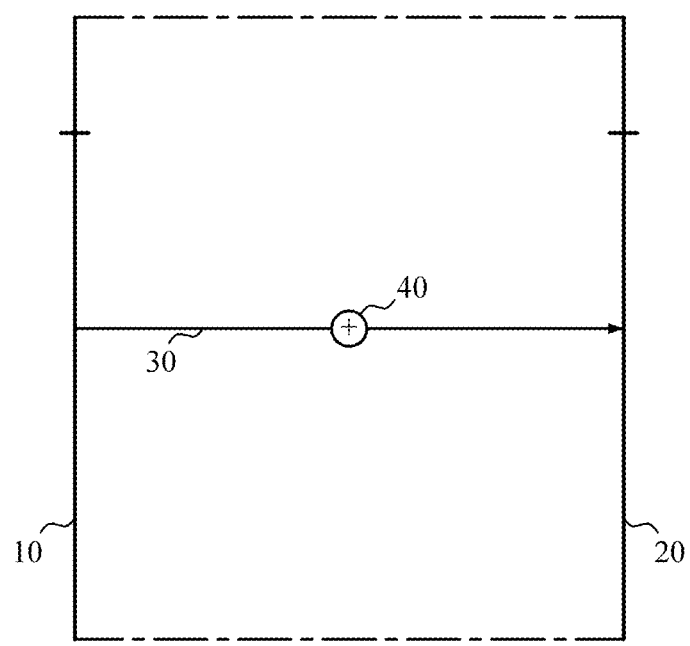
FIG. 6 illustrates a guideline showing a sublayer relation between the first line and the second line according to an embodiment.

FIG. 6 illustrates a sublayer relation between the first line 10 and the second line 20 according to an embodiment.

According to an aspect, before the applying of the sublayer (S3), the 3D clothing draping simulation method may further include generating a guideline 30 in one direction showing a sublayer relation between the first line 10 and the second line 20 and an operation symbol 40. As illustrated in FIG. 6, the guideline 30 in one direction is generated when the first line 10 is designated, and the guideline 30 in the corresponding one direction points the second line 20 when the second line 20 is designated. The guideline 30 in the one direction signifies that the first line 10 is overlaid on the second line 20 by moving toward the second line 20.

According to an embodiment, the operation symbol 40 is marked together on the guideline 30 in one direction. The operation symbol 40 represents a front and behind relation between a first sewing line and a second sewing line. Alternatively, the operation symbol 40 represents a top and bottom relation between a first sewing line and a second sewing line. For example, when a "+" sign is marked as illustrated in FIG. 6, a sublayer relation is set by the first sewing line overlapping the second sewing line in front of or above the second sewing line. In another example, when a "−" sign is marked as in FIG. 7, a sublayer relation is set by the first sewing line overlapping the second sewing line behind or below the second sewing line. This will be described in detail below.

Figure 7:
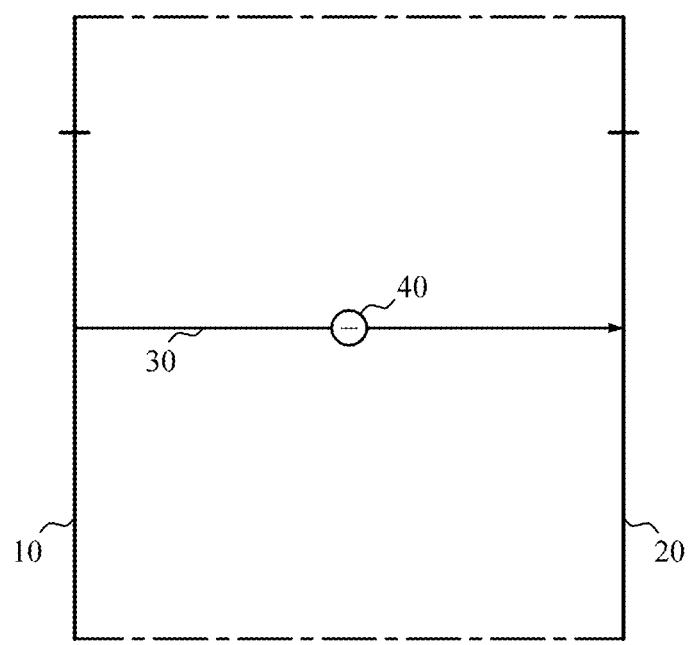
FIG. 7 illustrates a guideline showing a sublayer relation between the first line and the second line according to another embodiment.

In contrast to FIG. 6, FIG. 7 illustrates a state in which a sublayer relation is set so that the first sewing line is behind or below the second sewing line.

According to an aspect, the inputting of the sublayer (S2) includes receiving a front and behind relation between the first line 10 and the second line 20. According to an embodiment, when the first line 10 and the second line 20 are designated and the guideline 30 in one direction is generated between the first line 10 and the second line 20, a "+" operation symbol 40 may be basically marked together. That is, a sublayer relation may be set so that the first line 10 overlaps the second line 20 in front of or above the second line 20. Here, when an input for changing the set front and behind relation is received, the "+" sign is changed into the "−" sign. Then, when a sublayer is applied, a sublayer relation is applied so that the first line 10 overlaps the second line 20 behind or below the second line 20.

According to still another embodiment, when the first line 10 and the second line 20 are designated and the guideline 30 in one direction is generated between the first line 10 and the second line 20, a "−" operation symbol 40 may be basically marked together. Even in this case, the "−" sign changes to the "+" signal when an input for changing the set front and behind relation is received. Then, when a sublayer is applied, a sublayer relation is applied so that the first line 10 overlaps the second line 20 in front of or above the second line 20.

Figure 8:
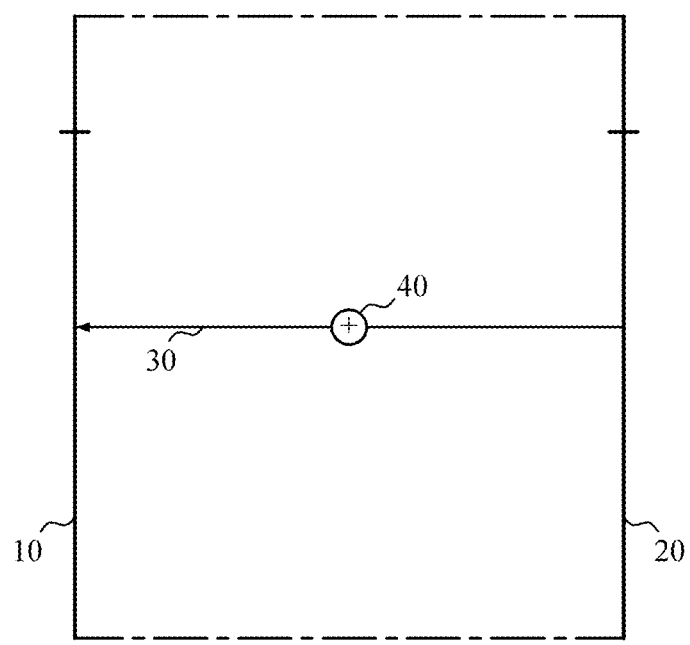
FIG. 8 illustrates a guideline showing a sublayer relation between the first line and the second line according to still another embodiment.

FIG. 8 illustrates a sublayer relation between the first line 10 and the second line 20 according to still another embodiment.

According to an aspect, the inputting of the sublayer further includes a reverse input step in which roles of the first line 10 and the second line 20 are switched. According to an embodiment, when the guideline 30 in one direction heading from the first line 10 toward the second line 20 is generated as in FIG. 6 or 7, when a sublayer is applied, the second line 20 is fixed and the first line 10 is moved to be in a layered relation with the second line 20. When a reverse input is received in the state illustrated in FIG. 6 or 7, the guideline 30 in the direction heading from the first line 10 toward the second line 20 is switched to a guideline 30 in one direction heading from the second line 20 toward the first line 10 as illustrated in FIG. 8. Then, when a sublayer is applied in the state illustrated in FIG. 8, the first line 10 is fixed, and the second line 20 is moved to be in a layered relation with the first line 10.

According to still another embodiment, when the guideline 30 in the direction heading from the second line 20 toward the first line 10 is generated as in FIG. 8, when a reverse input is received, the guideline 30 is switched to the guideline 30 in the direction heading from the first line 10 toward the second line 20 as in FIG. 6. As described above, when a sublayer is applied afterwards, the second line 20 is fixed, and the first line 10 is moved.

According to an embodiment, the reverse input may be input by selecting the "Reverse Direction" checkbox in the tool illustrated in FIG. 2.

The 3D clothing draping simulation method of the present disclosure may be produced as a downloadable computer program and stored in a computer-readable nonvolatile recording medium. Examples of a computer readable recording medium includes a read-only memory (ROM), a random access memory (RAM), a compact disc-ROM (CD-ROM), a magnetic tape, a floppy disk, an optical data storage, and the like, and also includes being implemented in the form of a carrier wave (e.g., transmission through the Internet).

The 3D clothing draping simulation apparatus includes a storage, a draper, and a display.

According to an embodiment, the storage may store avatars, patterns, subsidiary materials, and the like required to make 3D clothing to be used later. The storage may store 3D avatar models of various people of different gender and race having different faces, hairstyles, body sizes, and the like. Pieces of avatar information stored for each body part may be combined and used to generate a new avatar. The storage may store a database of patterns in accordance with types of clothes being used in the clothing industry. Alternatively, the storage may also store 2D patterns input through a CAD tool and provide the 2D patterns to a 2D pattern maker. The storage may store various 3D subsidiary materials such as a zipper, a button, a piping, and a ribbon and provide the 3D subsidiary materials in generating a 3D clothing.

According to an embodiment, the draper arranges a 2D pattern near an avatar model and fits the 2D pattern to the model through the draping process described above.

According to an embodiment, the 3D clothing draping simulation apparatus may further include a renderer. The renderer may receive clothing generation information which indicates that draping a 2D pattern is completed, process the information on a 3D screen, and output the information on the display.

According to an embodiment, the display may display a 2D pattern, a 3D subsidiary material, a 3D clothing, and a storing object. According to an aspect, the display may output a 2D pattern which is stored in the storage or a 2D pattern which is being made and provide the 2D pattern to a user through the screen. Every time the user inputs feature information (an outline, a mesh shape, and the like) regarding the 2D pattern, the 2D pattern being made is output on the screen by reflecting the inputs.

According to an embodiment, the display outputs 3D clothing which is rendered by the renderer after being generated. According to another embodiment, the 3D clothing may be output together with an avatar by being fitted to the avatar. Alternatively, only the avatar may be output, or only the 3D clothing may be output. According to still another embodiment, the display may display the clothing by using only meshes which are deformed due to draping the clothing or show the clothing using the pressure distribution thereof to be provided to the user as clothing producing information. According to an embodiment, the display may output an avatar to which the 3D clothing is fitted in a 3D view from all angles including top to bottom, left to right, and front to rear. For example, when an output angle on the 3D screen is set by a user manipulating an input device such as a mouse or a keyboard, the 3D clothing and the avatar are output in a 3D view from the set angle.

According to an aspect, the 3D clothing draping simulation apparatus includes a user interface part and a sublayer applier.

According to an embodiment, the user interface part receives information on 3D clothing generation from the user and transmits the received information to the draper configured to perform a draping simulation to process the received information.

According to an aspect, the user interface part includes a sewing line designator and a sublayer inputter.

According to an aspect, the sewing line designator receives designation of the first line 10 and the second line 20. According to an aspect, the sewing line designator receives designation of the first line 10 and the second line 20 from the user. According to an embodiment, the sewing line designator may designate the first line 10 and the second line 20 to which a sublayer will be set among sewing lines sewn on a 2D pattern or 3D clothing according to the user input. The first line 10 is designated first, and then the second line 20 is designated. According to an embodiment, the first line 10 and the second line 20 may be designated by a user clicking a sewing line marked on a 3D screen by an input device such as a mouse and a touch pen using a cursor output on the screen. According to an embodiment, every time the first line 10 and the second line 20 are designated, a marking state of a sewing line may be changed to show that the first line 10 and the second line 20 have been designated. For example, color of the sewing line is changed, or the sewing line is highlighted.

According to an embodiment, the sublayer inputter receives a sublayer relation between the first line 10 and the second line 20. According to an embodiment, a sublayer relation between the first line 10 and the second line 20 may be input after both of the first line 10 and the second line 20 are designated. For example, a sublayer relation may be input by the user selecting a checkbox for setting a sublayer. According to still another embodiment, the first line 10 and the second line 20 may be designated after the sublayer is input.

According to an aspect, the sublayer applier applies a layer limitation to a portion of a pattern including the first line 10 and the second line 20 so that the first line 10 and the second line 20 which have received a sublayer relation are layered with each other. As described above, the first line 10 and the second line 20 being layered with each other means that the first line 10 and the second line 20 are sewn to overlap each other by being in front of and behind each other. Alternatively, the first line 10 and the second line 20 being layered with each other means that the first line 10 and the second line 20 are sewn to overlap each other by being above or below each other. Also, as described above, the layer limitation refers to applying a virtual force between layered patterns so that intersection or collision does not occur between the patterns. According to an embodiment, the first line 10 and the second line 20 may belong to the same pattern or different patterns.

According to an embodiment, for the first line 10 and the second line 20 to be layered, a layer should be set to a pattern including the first line 10 and the second line 20. The first line 10 and the second line 20 actually become a standard for designating a region to which a layer will be applied within a pattern. As described above, the sublayer applier may extract a partial region of a pattern from patterns including the designated first line 10 and second line 20, and apply a layer limitation may be between the extracted regions so that the first line 10 and the second line 20 are layered with each other.

According to the present disclosure, by preventing tangling or intersection between patterns by a layering function having a sewing line as a unit, an error in a 3D clothing making process which does not occur in a real clothing making process can be removed.

According to the present disclosure, a layering function can be set on a partial region inside a pattern by the layering function having a sewing line as a unit.

The present disclosure have been described above using embodiments with reference to the accompanying drawings, but is not limited thereto. The present disclosure should be interpreted as including various modified embodiments that may be evidently derived from the above embodiments by one of ordinary skill in the art. The claims below are intended to include such modified embodiments.

What is claimed is:

1. A 3D clothing draping simulation method including draping 2D clothing patterns on an avatar model and rendering and displaying a draping result, the 3D clothing draping simulation method comprising:

designating a first line and a second line, among sewing lines, with respect to a received sublayer relation between the first line and the second line;

generating an operation symbol and a guideline in one direction showing the sublayer relation, wherein the sublayer relation is determined based on both the operation symbol and the direction of the guideline; and applying a layer limitation on a first partial region of a first pattern including the first line and a second partial region of a second pattern including the second line, wherein the applying of the layer limitation comprises:
extracting first meshes having the first line as a line segment from the first pattern,
extracting second meshes having the second line as a line segment from the second pattern, and
applying the layer limitation on the extracted first and second meshes so that the first line and the second line are layered with each other according to the sublayer relation, wherein the operation symbol represents a front and behind relation between the sewing lines, wherein the sublayer relation represents a relation in which the first and second lines are sewn to overlap each other, wherein the first pattern including the first line, and the second pattern including the second line are movable in relation to each other, wherein the direction of the guideline is switched from heading from the first line to the second line to heading from the second line to the first line based on a receipt of a first reverse input, and wherein the operation symbol is switched from a first sign indicating a starting line corresponding to a starting point of the guideline being behind or below an ending line corresponding to an ending point of the guideline to a second sign indicating the starting line being in front of or above the ending line based on a receipt of a second reverse input.

2. The 3D clothing draping simulation method of claim 1, further comprising extracting the sewing lines, which are sewn on a clothing pattern.

3. The 3D clothing draping simulation method of claim 1, wherein the sewing lines are extracted in response to a sublayer tool being selected.

4. The 3D clothing draping simulation method of claim 1, wherein the applying of the layer limitation includes fixing a first pattern region including the second line as the line segment, moving a second pattern region including the first line as the line segment, and overlaying the first pattern region on the second pattern region.

5. The 3D clothing draping simulation method of claim 1, wherein the applying of the layer limitation includes connecting lattice points of the first mesh and second mesh by a spring.

6. The 3D clothing draping simulation method of claim 5, wherein the designating of the first line and the second line includes switching roles of the first line and the second line.

7. The 3D clothing draping simulation method of claim 1, wherein the designating of the first line and the second line includes receiving the front and behind relation.

8. The 3D clothing draping simulation method of claim 1, wherein lattice points of the first line and lattice points of the second line correspond to each other.

9. The 3D clothing draping simulation method of claim 1, wherein the first pattern and the second pattern are different from each other.

10. The 3D clothing draping simulation method of claim 1, wherein the first pattern and the second pattern are the same.

11. The 3D clothing draping simulation method of claim 1, further comprising applying a sublayer, wherein the sublayer relation of the sublayer is applied so that the designated first line overlaps the designated second line in front of or above the second line, and the sublayer is disposed between the designated first line and the designated second line.

12. The 3D clothing draping simulation method of claim 1, wherein the guideline is generated when the first line is designated, and the guideline points in the direction of the second line when the second line is designated.

13. The 3D clothing draping simulation method of claim 12, wherein the guideline pointing in the direction of the second line indicates that the first line is overlaid on the second line.

14. A 3D clothing draping simulation apparatus including a draper configured to drape 2D clothing patterns on an avatar model and a display configured to render and display a draping result, the 3D clothing draping simulation apparatus comprising:
   a sewing line designator configured to receive designation of a first line and a second line, among sewing lines;
   a user interface including a sublayer inputter configured to receive a sublayer relation between the first line and the second line; and
   a sublayer applier configured to apply a layer limitation on a portion of a first pattern including the first line and a second pattern including the second line so that the first line and the second line which have received the sublayer relation are layered with each other,
   wherein the sublayer applier is further configured to generate an operation symbol and a guideline in one direction showing the sublayer relation between the first and second lines, the sublayer relation being determined based on both the operation symbol and the direction of the guideline,
   wherein the operation symbol represents a front and behind relation between the sewing lines,
   wherein the sublayer relation represents a relation in which the first and second lines are sewn to overlap each other,
   wherein the sublayer applier is further configured to designate partial regions to a layer within the first pattern including the first line and the second pattern including the second line,
   wherein the first pattern including the first line and the second pattern including the second line are movable in relation to each other,
   wherein the direction of the guideline is switched from heading from the first line to the second line to heading from the second line to the first line based on a receipt of a first reverse input, and
   wherein the operation symbol is switched from a first sign indicating a starting line corresponding to a starting point of the guideline being behind or below an ending line corresponding to an ending point of the guideline to a second sign indicating the starting line being in front of or above the ending line based on a receipt of a second reverse input.

15. The 3D clothing draping simulation apparatus of claim 14, wherein lattice points of the first line and lattice points of the second line correspond to each other.

16. The 3D clothing draping simulation apparatus of claim 14, wherein meshes having the first line as a line segment are extracted from the first pattern, and meshes having the second line as a line segment are extracted from a the second pattern.

17. The 3D clothing draping simulation apparatus of claim 14, wherein the sewing lines are extracted in response to a sublayer tool being selected.

* * * * *